UNITED STATES PATENT OFFICE 2,363,092

METHOD OF MAKING 6,10,14-TRIMETHYL-PENTADECANONE-2

Lee Irvin Smith and Joseph A. Sprung, Minneapolis, Minn., assignors to Regents of the University of Minnesota, Minneapolis, Minn., a corporation of Minnesota No Drawing. Application August 1, 1942,
Serial No. 453,280

3 Claims. (Cl. 260—593)

This invention relates to new methods of making 6,10,14-trimethyl-pentadecanone-2 which is useful in the preparation of phytol, isophytol and phytol and isophytol derivatives.

The preparation of 6,10,14-trimethyl-pentadecanone-2 has heretofore been accomplished by utilizing natural phytol, an expensive material, and while syntheses have been provided, Annalen 464, 69 (1928), 475, 183 (1929), Helvetica Chimica Acta, 22, 610 (1939), they have not completely satisfied requirements because of the complex procedures, and the low yields involved.

It is an object of the present invention to provide an improved method of synthesizing 6,10,14-trimethyl-pentadecanone-2 utilizing available, relatively inexpensive ingredients and involving efficient procedural steps.

In carrying out the invention there is utilized, as one starting ingredient, a Grignard reagent, 4,8,12 - trimethyl - tridecyl magnesium halide which may be prepared from magnesium and 1-halo-4,8,12-trimethyl-tridecane. The latter may be prepared conveniently in several steps and at low cost, from pseudoionone, as described in our co-pending application Ser. No. 453,281, filed August 1, 1942, and as described in our article in the Journal of the American Chemical Society, 65, 1276 (1943), particularly at pages 1280 and 1281, under the subtitle "1-bromo-4,8,12-trimethyltridecane."

The 4,8,12-trimethyl-tridecyl magnesium halide is preferably the bromide or chloride. The corresponding iodide may be used but the reaction is less efficient. The 4,8,12-trimethyl-tridecyl magnesium halide is then reacted with acetaldehyde and the resultant Grignard addition product is hydrolyzed under acidic conditions to form the carbinol which is then oxidized, so as to form the desired 6,10,14-trimethyl-pentadecanone-2. The process is believed to be accurately represented by the following equations, which, however, should not be considered as a limitation upon the invention:

I 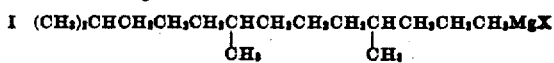

(4,8,12-trimethyl-tridecyl magnesium halide, X being halogen)

+

II $\qquad$ CH₃CH=O

(acetaldehyde)

III 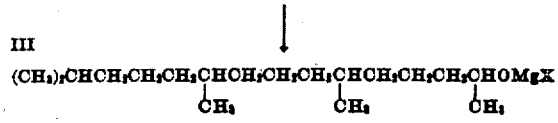

(Grignard addition product)

↓ (hydrolyzed preferably under acidic conditions)

IV 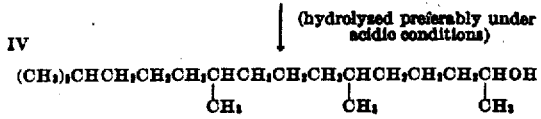

(6,10,14-trimethyl-pentadecanol-2)

↓ (oxidized)

V 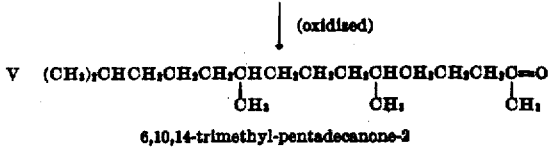

6,10,14-trimethyl-pentadecanone-2

It may be pointed out that the hydrolysis of Compound III may be carried out under alkaline, neutral, or acidic conditions, but as the magnesium is removed at this stage in the form of the hydroxide, the separation may be made most conveniently under slightly acid conditions or in the presence of some reagent such as ammonium chloride solution in which the magnesium hydroxide is soluble. Under neutral or alkaline conditions the magnesium hydroxide precipitates as a thick gel and can be removed only with difficulty.

The oxidation of Compound IV may be accomplished by any suitable oxidizing agent for converting alcohols to the corresponding carbonyl compounds. There are very many oxidizing agents of which a few, viz., sodium dichromate, potassium permanganate, and manganese dioxide are exemplary. Sodium dichromate under acidic conditions (viz., acidified with sulfuric acid) is preferred because of low cost, favorable reaction conditions and availability.

The magnesium halide, Compound I, may be either the bromide, chloride or iodide, of which the bromide is preferred because of favorable yields. The chloride and iodide are also satisfactory, though less easily obtainable.

The invention is illustrated by the following example which, however, must not be considered as a limitation upon the invention.

*Example*

A Grignard solution was prepared from 41.0 grams (0.135 mole) of pure 1-bromo-4,8,12-trimethyl-tridecane, ($nD25=1.4598$), Structure I, and 4.85 grams (0.2 mole) of magnesium in 75 cc. of dry ethyl ether. To the stirred solution which had been cooled to 0° C., there was slowly added 20 cc. of acetaldehyde, Structure II, in 50 cc. of dry ethyl ether. The reaction was completed by refluxing the mixture for ½ hour and resulted in the formation of the addition product, Structure III.

The Grignard addition product, Structure III, was extracted with more ether, the combined ethereal solutions were washed with water, dried over sodium sulfate and the solvent was removed. The resultant alcohol, 6,10,14-trimethyl-pentadecanol-2 was distilled and it boiled at 150–155° C./3 mm. Hg pressure, and was obtained in a yield of 25.5 grams (70%). It had a refractive index of $nD25=1.4448$ and contained 80.39% carbon and 13.88% hydrogen, whereas theoretical percentages of these constituents, calculated for $C_{18}H_{38}O$ are 79.91% carbon and 14.17% hydrogen.

Twenty-five grams (0.0925 mole) of the above 6,10,14-trimethyl-pentadecanol-2, Structure IV, was dissolved in 30 cc. of benzene and slowly added to a well stirred solution of 21 grams (0.07 mole) of sodium dichromate $$(Na_2Cr_2O_7 \cdot 2H_2O)$$

in 8 cc. (0.14 mole) of concentrated sulfuric acid (density 1.84), 30 cc. of glacial acetic acid and 65 cc. of water. The temperature rose to 50° C. and after it had fallen to 40° C., the stirred reaction mixture was maintained at the latter temperature for 1 hour. The orange-green mixture was extracted with ether, the ethereal layer separated and washed with water and 5% sodium hydroxide and finally dried over sodium sulfate. The solvent was then removed.

The residual 6,10,14 - trimethyl - pentadecanone-2 (Structure V), so prepared, boiled at 150–152° C./3 mm. of Hg pressure and weighed 18.7 grams (75.5%) yield. It had a refractive index of $nD25=1.4433$ and contained 80.75% carbon and 13.30% hydrogen, whereas theoretical percentages of these ingredients calculated for $C_{18}H_{36}O$ are 80.50% carbon and 13.53% hydrogen. The semi-carbazone of 6,10,14-trimethyl-pentadecanone melted at 70–70.5° C.

It is noted that the name "phytol-ketone" has sometimes been used to designate the compound 6,10,14-trimethyl-pentadecanone-2, because the compound was originally obtained by the oxidation of phytol. The name of this product, according to Geneva nomenclature is 6,10,14-trimethyl-pentadecanone-2. It has also been designated 2,6,10 - trimethyl - pentadecanone-14 where the numbering is begun at the opposite end of the molecule.

Many variations of the foregoing methods will be apparent to those skilled in the art, and are intended to be within the purview of the invention illustrated, described and claimed.

What we claim is:

1. The method of preparing 6,10,14-trimethyl-pentadecanone-2 which comprises reacting a 4,8,12-trimethyl-tridecyl magnesium halide and acetaldehyde, hydrolyzing the addition product so formed, oxidizing the resultant carbinol and separating the 6,10,14 - trimethyl - pentadecanone-2 so produced.

2. The method of preparing 6,10,14-trimethyl-pentadecanone-2 which comprises reacting 4,8,12-trimethyl-tridecyl magnesium bromide and acetaldehyde, hydrolyzing the addition product so formed, oxidizing the resultant carbinol, and separating the 6,10,14 - trimethyl - pentadecanone-2 so produced.

3. The method of preparing 6,10,14-trimethyl-pentadecanone-2 which comprises reacting 4,8,12-trimethyl-tridecyl magnesium chloride and acetaldehyde, hydrolyzing the addition product so formed, oxidizing the resultant carbinol and separating the 6,10,14 - trimethyl - pentadecanone-2 so produced.

LEE IRVIN SMITH.
JOSEPH A. SPRUNG.

---

CERTIFICATE OF CORRECTION.

November 21, 1944.

Patent No. 2,363,092.

LEE IRVIN SMITH, ET AL.

It is hereby certified that error appears in the printed specification of the above numbered patent requiring correction as follows: Page 2, first column, line 26 and 43, and second column, line 12, for "nD25" read ; and that the said Letters Patent should be read with this correction therein that the same may conform to the record of the case in the Patent Office.

Signed and sealed this 10th day of April, A. D. 1945.

Leslie Frazer
Acting Commissioner of Patents.

(Seal)

ditions the magnesium hydroxide precipitates as a thick gel and can be removed only with difficulty.

The oxidation of Compound IV may be accomplished by any suitable oxidizing agent for converting alcohols to the corresponding carbonyl compounds. There are very many oxidizing agents of which a few, viz., sodium dichromate, potassium permanganate, and manganese dioxide are exemplary. Sodium dichromate under acidic conditions (viz., acidified with sulfuric acid) is preferred because of low cost, favorable reaction conditions and availability.

The magnesium halide, Compound I, may be either the bromide, chloride or iodide, of which the bromide is preferred because of favorable yields. The chloride and iodide are also satisfactory, though less easily obtainable.

The invention is illustrated by the following example which, however, must not be considered as a limitation upon the invention.

*Example*

A Grignard solution was prepared from 41.0 grams (0.135 mole) of pure 1-bromo-4,8,12-trimethyl-tridecane, ($nD25=1.4598$), Structure I, and 4.85 grams (0.2 mole) of magnesium in 75 cc. of dry ethyl ether. To the stirred solution which had been cooled to 0° C., there was slowly added 20 cc. of acetaldehyde, Structure II, in 50 cc. of dry ethyl ether. The reaction was completed by refluxing the mixture for ½ hour and resulted in the formation of the addition product, Structure III.

The Grignard addition product, Structure III, was extracted with more ether, the combined ethereal solutions were washed with water, dried over sodium sulfate and the solvent was removed. The resultant alcohol, 6,10,14-trimethyl-pentadecanol-2 was distilled and it boiled at 150–155° C./3 mm. Hg pressure, and was obtained in a yield of 25.5 grams (70%). It had a refractive index of $nD25=1.4448$ and contained 80.39% carbon and 13.88% hydrogen, whereas theoretical percentages of these constituents, calculated for $C_{18}H_{38}O$ are 79.91% carbon and 14.17% hydrogen.

Twenty-five grams (0.0925 mole) of the above 6,10,14-trimethyl-pentadecanol-2, Structure IV, was dissolved in 30 cc. of benzene and slowly added to a well stirred solution of 21 grams (0.07 mole) of sodium dichromate ($Na_2Cr_2O_7.2H_2O$)

in 8 cc. (0.14 mole) of concentrated sulfuric acid (density 1.84), 30 cc. of glacial acetic acid and 65 cc. of water. The temperature rose to 50° C. and after it had fallen to 40° C., the stirred reaction mixture was maintained at the latter temperature for 1 hour. The orange-green mixture was extracted with ether, the ethereal layer separated and washed with water and 5% sodium hydroxide and finally dried over sodium sulfate. The solvent was then removed.

The residual 6,10,14 - trimethyl - pentadecanone-2 (Structure V), so prepared, boiled at 150–152° C./3 mm. of Hg pressure and weighed 18.7 grams (75.5%) yield. It had a refractive index of $nD25=1.4433$ and contained 80.75% carbon and 13.30% hydrogen, whereas theoretical percentages of these ingredients calculated for $C_{18}H_{36}O$ are 80.50% carbon and 13.53% hydrogen. The semi-carbazone of 6,10,14-trimethyl-pentadecanone melted at 70–70.5° C.

It is noted that the name "phytol-ketone" has sometimes been used to designate the compound 6,10,14-trimethyl-pentadecanone-2, because the compound was originally obtained by the oxidation of phytol. The name of this product, according to Geneva nomenclature is 6,10,14-trimethyl-pentadecanone-2. It has also been designated 2,6,10 - trimethyl - pentadecanone-14 where the numbering is begun at the opposite end of the molecule.

Many variations of the foregoing methods will be apparent to those skilled in the art, and are intended to be within the purview of the invention illustrated, described and claimed.

What we claim is:

1. The method of preparing 6,10,14-trimethyl-pentadecanone-2 which comprises reacting a 4,8,12-trimethyl-tridecyl magnesium halide and acetaldehyde, hydrolyzing the addition product so formed, oxidizing the resultant carbinol and separating the 6,10,14 - trimethyl - pentadecanone-2 so produced.

2. The method of preparing 6,10,14-trimethyl-pentadecanone-2 which comprises reacting 4,8,-12-trimethyl-tridecyl magnesium bromide and acetaldehyde, hydrolyzing the addition product so formed, oxidizing the resultant carbinol, and separating the 6,10,14 - trimethyl - pentadecanone-2 so produced.

3. The method of preparing 6,10,14-trimethyl-pentadecanone-2 which comprises reacting 4,8,-12-trimethyl-tridecyl magnesium chloride and acetaldehyde, hydrolyzing the addition product so formed, oxidizing the resultant carbinol and separating the 6,10,14 - trimethyl - pentadecanone-2 so produced.

LEE IRVIN SMITH.
JOSEPH A. SPRUNG.

---

CERTIFICATE OF CORRECTION.

November 21, 1944.

Patent No. 2,363,092.

LEE IRVIN SMITH, ET AL.

It is hereby certified that error appears in the printed specification of the above numbered patent requiring correction as follows: Page 2, first column, line 26 and 43, and second column, line 12, for "nD25" read --$n\frac{25}{D}$--; and that the said Letters Patent should be read with this correction therein that the same may conform to the record of the case in the Patent Office.

Signed and sealed this 10th day of April, A. D. 1945.

Leslie Frazer
Acting Commissioner of Patents.

(Seal)